United States Patent Office 3,167,459
Patented Jan. 26, 1965

3,167,459
HEAT-TREATMENT PROCESS FOR METALLIC
AND OTHER PRODUCTS
Maurice Daguier, 10 Rue Lasson, Paris, France
No Drawing. Filed June 12, 1962, Ser. No. 201,780
Claims priority, application France, June 13, 1961,
864,725, Patent 1,301,292
1 Claim. (Cl. 148—13.1)

The thermal treatment of metallic or other products is usually effected in furnaces wherein the atmosphere is agitated or not.

To avoid any damage or degradation of the treated products, two methods are generally resorted to:

(1) Using furnaces permitting a treatment in vacuo, whereby any trace of reducing gas, oxidizer, carburizing or decarburizing agents, as well as any greases, oils or other impurities likely to be present in the product to be treated, are substantially eliminated.

The chief drawback in this case is that the treatment may require a long time, due to the fact that heat exchanges are particularly moderate when operating in vacuo. In addition, the precision of the temperature control is rather poor.

To avoid these drawbacks, it is possible to introduce a controlled atmosphere at the proper time in the furnace, but furnaces of this type have no ventilation system and therefore the reduction in the treatment time which is thus obtained is negligible and the temperature uniformity is still objectionable.

(2) Using furnaces wherein a controlled atmosphere of a given composition is introduced.

These furnaces are advantageously provided with ventilation systems whereby the heat exchanges can be accelerated considerably while homogenizing the temperature and therefore reducing to a reasonable value the treatment time. But in certain specific cases the appearance and quality of the products thus obtained is not so good as those of products obtained in a vacuumized furnace, since the impurities usually eliminated when applying a treatment in vacuo remain in the case of a treatment utilizing a controlled atmosphere.

It is the object of the present invention to provide a method of applying a heat treatment to metallic or other products whereby all the advantages of the methods broadly set forth hereinabove are obtained while eliminating their drawbacks.

As an example, rolled strip-steel is treated in a furnace permitting both a treatment in vacuo and the introduction of a controlled atmosphere, this furnace being equipped with means for ventilating the atmosphere therein, and that at least one vacuum time period is provided between the treatment time periods in controlled atmosphere during the heating when the temperature of the mass of treated products exceeds the vaporization temperature of the oils and greases to be eliminated and is lower than their cracking temperature, whereby this vacuum time period occurs when the furnace is still at a relatively low temperature, in any case below 500° C. (930° F.), in order to avoid the necessity of reinforcing the vacuum-tight chamber as compulsory in furnaces designed for heating products in vacuo at high temperatures. The temperature is then raised to complete the heat treatment.

With this application of vacuum at a relatively low temperature it is possible to use for the purposes specified a furnace having a closed and ventilated chamber, for example a conventional ventilated bell-type furnace modified to enable its fluid-tightness to withstand a relatively high vacuum. The fan may be provided with a fluid-tight seal or any other suitable packing permitting the passage of its shaft through the wall of the furnace.

Thus, notably, for treating products in the form of rings or the like, as in the case of rolls of wires, a turbine may apply a suction to the controlled atmosphere of the furnace through said rings of product to be treated which are stacked axially in the furnace, and deliver the atmosphere radially through these rings in order to provide a continuous and forced circulation.

The treatment is very fast due to the magnitude of the heat exchange resulting from the forced ventilation of the controlled atmosphere; the products are free of any impurities due to the elimination, during the vacuum periods, of any trace of impurities likely to contaminate these products; the treatment of the products can be controlled with a high degree of precision due to the ventilation of the gas fed to the furnace whereby the temperature can be adjusted within very close limits.

Since the difference between the evaporation temperature in vacuo and the cracking temperature of the oils and greases to be eliminated is rather small in certain cases, the strong ventilation permits of uniform temperature throughout of the complete mass to be treated, before vacuumizing the furnace, without maintaining the temperature at a constant level during a long time period, thereby avoiding the non-vaporization of oils and/or greases in cold spots, or the premature cracking of oils and/or greases in hot spots.

As a result, the present method affords considerable saving in time for treating a given charge, together with a substantial improvement in the quality and appearance of the final product.

What I claim is:

A method of heat-treating metallic products in a furnace to eliminate any trace of any oils, greases or other impurities coating the product to be treated, consisting in disposing the products to be treated in the furnace, introducing a controlled atmosphere into said furnace, heating said furnace while ventilating said controlled atmosphere to accelerate the heat transfer between said controlled atmosphere and the products to be treated, applying vacuum to said furnace when the temperature of the whole of the products to be treated exceeds the temperature of vaporization in vacuo of the oils and greases to be removed therefrom and is below their cracking temperature, discontinuing the application of vacuum to said furnace after the oils and greases which had distilled off as a consequence of the temperature, without cracking, have been eliminated by the vacuum action, and completing the heat treatment by restoring in said furnace a controlled atmosphere by heating said furnace to a relatively high temperature while strongly ventilating said controlled atmosphere until the products to be treated have attained the desired treatment temperature, and keeping said products at said treatment temperature during the time necessary for carrying out said treatment.

References Cited by the Examiner
UNITED STATES PATENTS

| | | | |
|---|---|---|---|
| 2,152,154 | 3/39 | Robiette | 148—20.3 |
| 2,809,140 | 10/57 | Smeaton | 148—13.1 |
| 3,012,591 | 12/61 | McCormack et al. | 148—16 |

DAVID L. RECK, *Primary Examiner.*

RAY K. WINDHAM, *Examiner.*